Figure 1:
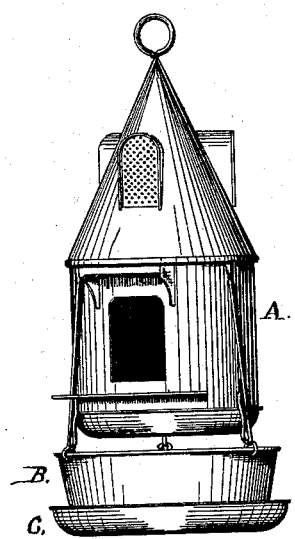

S. VANSTONE.
Combined Hanging-Baskets and Bird-Cages.

No. 137,980. Patented April 15, 1873.

WITNESSES:
Walter B Vincent
James H Parsons

INVENTOR:
Samuel Vanstone

UNITED STATES PATENT OFFICE.

SAMUEL VANSTONE, OF PROVIDENCE, RHODE ISLAND.

IMPROVEMENT IN COMBINED HANGING BASKETS AND BIRD-CAGES.

Specification forming part of Letters Patent No. 137,980, dated April 15, 1873; application filed March 24, 1873.

*To all whom it may concern:*

Be it known that I, SAMUEL VANSTONE, of the city and county of Providence, in the State of Rhode Island, have invented a new and useful Combined Bird-House and Hanging Basket; and I do hereby declare that the following specification, taken in connection with the drawing making a part of the same, is a full, clear, and exact description thereof.

Figure 2:
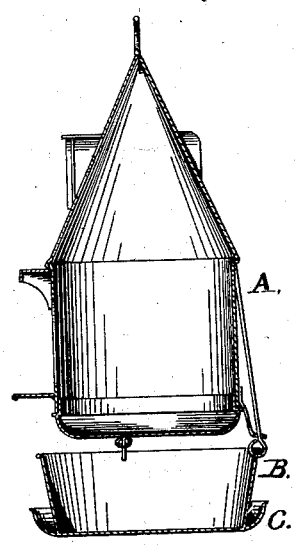

Figure 1 is a view of my invention. Fig. 2 is a vertical section through center of door.

The object of my invention is to produce a new article of manufacture designed to beautify and adorn the house or yard; and consists in the device for that purpose hereinafter described.

In my invention I combine with a bird house or cage of any tasteful design a basket of growing flowers, which is suspended under the same and at a suitable distance therefrom.

In the drawing, A, Figs. 1 and 2, is a bird house or cage designed for outdoor use, having three or more rods extending downward from the eaves thereof, to which is attached a pan or basket, B, which is filled with dirt and growing flowers set out therein. Underneath and attached to this basket B is a pan, C, which is intended to catch the drip.

What I claim as my invention, and desire to secure by Letters Patent, is—

The combination of the bird house or cage A, the basket B, and the pan C, the whole arranged in the manner substantially as described, for the purpose specified.

Witnesses:  SAMUEL VANSTONE.
WALTER B. VINCENT,
JAMES H. PARSONS.